United States Patent [19]
McCan

[11] 3,979,583
[45] Sept. 7, 1976

[54] PHOTOFLASH FILTER

[75] Inventor: John J. McCan, Belmont, Mass.

[73] Assignee: Polaroid Corporation, Cambridge, Mass.

[22] Filed: July 26, 1974

[21] Appl. No.: 492,055

[52] U.S. Cl.................................. 240/1.3; 350/1
[51] Int. Cl.².................................. G03B 15/02
[58] Field of Search............. 240/1 A, 1.3, 1.4; 252/300; 350/1

[56] References Cited
UNITED STATES PATENTS

| | | | |
|---|---|---|---|
| 2,747,076 | 5/1956 | Eloranta | 240/1.3 |
| 2,979,601 | 4/1961 | Mc Clees | 240/1.3 |
| 3,127,111 | 3/1964 | Baring | 240/1.3 |
| 3,177,354 | 4/1965 | Appleton | 240/1.3 X |
| 3,255,342 | 6/1966 | Seitz et al. | 240/1.4 |
| 3,588,216 | 6/1971 | Bloom | 350/1 |
| 3,725,692 | 4/1973 | Miller et al. | 240/1.3 |
| 3,806,462 | 4/1974 | Bloom | 350/1 X |

*Primary Examiner*—Fred L. Braun
*Attorney, Agent, or Firm*—Philip G. Kiely; Mart C. Matthews; Stanley H. Mervis

[57] ABSTRACT

Illumination from a photoflash lamp is limited to radiation useful for photographic exposure by providing the photoflash lamp with an infrared absorbing filter possessing photographically desirable transmission properties in the visible region of the spectrum.

4 Claims, 3 Drawing Figures

PHOTOFLASH FILTER

BACKGROUND OF THE INVENTION

1. Field of the Invention

This invention relates to photography and more particularly to artificial photoflash illumination provided for photographic exposure.

2. Description of the Prior Art

It is, of course, well known in the photographic art to employ filters of various types in combination with photoflash lamps. However, the previous efforts in this direction have had purposes quite different than the present invention, as will be apparent from the discussion hereinafter presented.

By far the most common reason for providing photoflash filtration in the prior art has been for the purpose of altering the spectral composition of the radiation emitted by the photoflash lamp so as to duplicate as closely as possible the characteristics of average daylight. The light transmitted by such a filter is thereby capable of being employed for photographic exposures of film normally intended for daylight exposure under conditions where such film would not otherwise be usable, and is especially advantageous in color photography for providing more accurate color reproduction and balance. This process of adjusting the spectral characteristics of artificial illumination to a standard for use in color photography is designated herein and in the art as "color correction". For examples of such color correcting filters, see U.S. Pat. Nos. 2,269,984 and 2,465,068.

Photoflash lamps have also been provided in the prior art with filters which are essentially opaque to the visible radiation emitted therefrom while permitting the transmission of invisible radiation such as infrared or ultraviolet radiation. These filtered photoflash lamps are especially suitable for so-called "black out" photography employing special films having sensitivity to such invisible radiation. See, for example, U.S. Pat. No. 2,337,485.

It is known that over half of the total radiation emitted from most high temperature bodies such as the sun, tungsten filaments, carbon arcs, photoflash lamps, and the like, lies in what is designated as the near-infrared region of the radiation spectrum, i.e., the region from about 700 nanometers (hereinafter abbreviated as nm) to about 2,000 nm in wavelength. As an example, some 65% of the radiation emitted from a true 4,700° K black body radiator, similar to a typical photoflash light source, is in the aforementioned near-infrared region.

On the other hand, the sensitivity of conventional color negative emulsions is, for obvious reasons, confined only to the region of visible radiation, i.e., from about 400 nm to about 700 nm in wavelength. In other words, the film "sees" only about 35% of the total radiant energy emitted from a typical photoflash lamp.

Accordingly, it may be seen that a large proportion of the energy emitted by common photoflash lamps serves no useful purpose with respect to photographic illumination. Although there is no evidence as yet that this radiation contributes to undesirable side effects, or possible harm to the eye of the subject being photographed, the conservative position would be to limit the radiation of photoflash lamps to only the radiation used by the photographic process.

BRIEF SUMMARY OF THE INVENTION

In accordance with the practice of the present invention, illumination provided by a photoflash lamp for the exposure of photographic film, particularly color film, is essentially limited in spectral radiation distribution to only that region wherein such film is photosensitive, by providing, in association with said photoflash lamp, a filter element which possesses optimum transmission properties in the visible region and minimum transmission (or maximum absorption) in the infrared region of the radiation spectrum.

Although alternative arrangements are known and will be obvious to those skilled in the art, the aforementioned filter element preferably comprises a visibly transparent plastic envelope surrounding an assembly including one or more photoflash lamps. This envelope may also serve structural and/or safety purposes and furthermore may be tinted to enhance the photographic quality of the visible radiation produced by the photoflash lamp in accordance with practices well known to the photographic art.

The desirable spectral characteristics employed in this invention may be imparted to the above-described filter element by incorporating therein by known techniques any of the various additives or combinations of additives known to filter out a significant amount of the radiation which lies outside the visible region of the spectrum while effectively transmitting photographically usable radiation falling within the visible region.

Accordingly, the preferred materials of the aforementioned class are dyes which alone or in combination, possess a peak of maximum absorption in the spectral region about 700 nm yet are essentially transparent to visible radiation in the region from 400 nm to about 700 nm or exhibit selective absorption in this visible region which enhances the photographic quality of the emitted radiation. Particularly preferred are those dyes which, in addition to the spectral characteristics described above, show a good stability to the degradative forces of light, heat and humidity and are suitable for coating on, or incorporation in, plastomeric media such as the preferred envelope described hereinbefore.

It is, therefore, an object of the present invention to provide artificial illumination for use in photography from which invisible radiation serving no useful photographic purpose is significantly reduced without materially diminishing the visible radiation needed for effective photoexposure.

Another object is to provide illumination apparatus and methods for use in photography which essentially involve a photoflash lamp in combination with a filter element which is adapted to filter out a significant amount of photographically unusable radiation emitted therefrom without materially affecting the transmission of photographically desirable visible radiation.

A still further object is to provide illumination apparatus and methods of the above-mentioned type wherein the filter element includes a material or combination of materials providing maximum absorption in the spectral region above 700 nm while providing optimum transmission in the visible region.

A still further object is to provide illumination apparatus and methods of the above-mentioned type wherein the filter element includes a material or combination of materials providing maximum absorption in the spectral region above 700 nm while also providing selective absorption in the visible region for the purpose of enhancing the photographic quality of the radiation transmitted by said filter element.

Other objects of this invention will in part be obvious and will in part appear hereinafter.

DETAILED DESCRIPTION OF THE INVENTION

The filter element of the present invention may be associated with the photoflash lamp according to any of the various arrangements described or anticipated by the art. Thus, the filter element may take the form of a coating formed on the inside or outside of the glass bulb itself by spraying, dipping, and the like; or may be incorporated as a separate barrier disposed in the path of the radiation emitted from the photoflash lamp.

Figure 1:
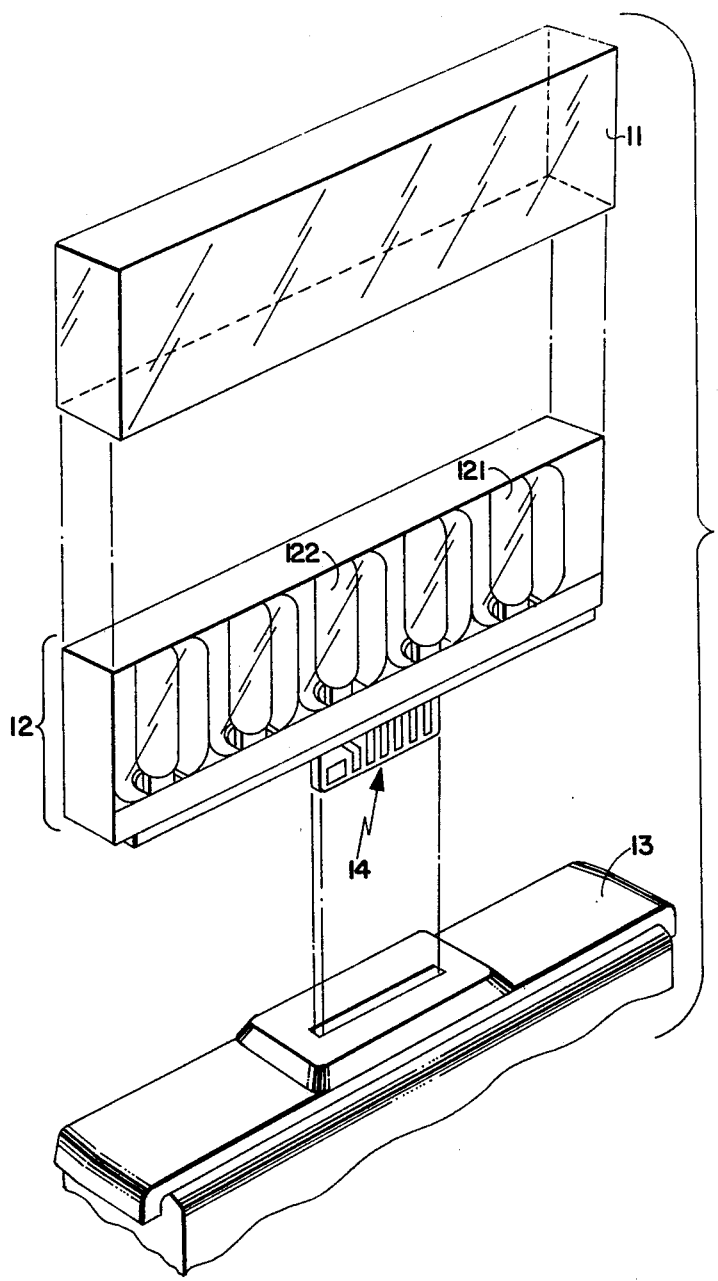
FIG. 1 is a perspective view showing a preferred embodiment of this invention for use with an array of photoflash lamps.

For example, FIG. 1 shows one preferred arrangement wherein the filter element of the present invention is transparent envelope 11 which fits over and is secured to the photoflash assembly 12, which assembly comprises a linear array of photoflash lamps, two of which are designated as 121 and 122. Envelope 11 may serve to hold the array of photoflash lamps in assembled position and also may serve as a safety shield. The entire assembly may be detachably mounted through electrical connection means 14 to camera housing 13. Further details on photoflash lamp assemblies of the above-described type and several variations thereof may be found in, for example, U.S. Pat. Nos. 3,598,984; 3,598,985; and 3,614,412. It is to be realized that other similar arrangements, including the commercially familiar "flashcube" arrangement such as described in, for example, U.S. Patent No. 2,982,119, are also contemplated as suitable in the practice of the present invention.

Figure 2:
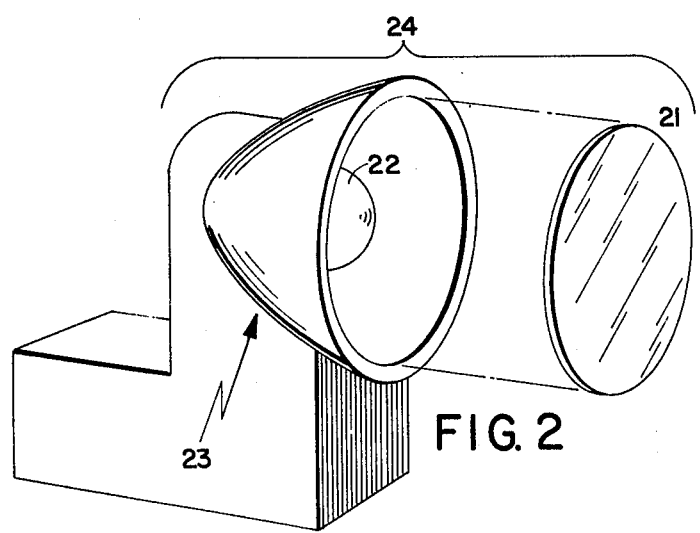
FIG. 2 is a perspective view showing another embodiment of this invention for use with a single photoflash lamp.

FIG. 2 illustrates another embodiment wherein a single photoflash lamp 22 is positioned within flash reflector 23 of flash gun assembly 24. Transparent cover 21 which may serve as the filter element of the present invention is disposed over the open end of flash reflector 23, so that the radiation emitted by photoflash lamp 22 must pass therethrough, and be filtered thereby, before it reaches the scene being illuminated.

The fabrication material employed in the above-described filter element may be glass, but is preferably an organic plastomeric material having generally suitable transmission properties in the visible region. Illustrative examples of suitable plastomeric materials include various cellulose derivatives, polystyrene plastics, vinyl polymers and copolymers, acrylic resins, polyolefins, polyesters, polymers of alkyl diglycol carbonate, and the like. Of particular interest and presently preferred herein are the polystyrene plastics such as, for example, the clear general purpose polystyrene No. 666 U, marketed by Dow Chemical Company.

Any of these various plastics may, and usually does, vary from the others very appreciably in its transmission of radiant energy at various wavelengths. Nevertheless, if not modified, none meet the necessary spectral requirements for employment in this invention. Some additive or combination of additives is, therefore, necessary to decrease the infrared transmission without adversely affecting transmission in the visible regions.

Preferred additives or combinations of additives exhibit strong absorption in the infrared region, particularly the near-infrared region above about 700 nm with optimum transmission in the region of conventional color film sensitivity, i.e., the visible region from about 400 nm to about 700 nm. The additive or additives preferably absorb at least 10% of the total infrared radiation having wavelengths between 700 nm and 2,000 nm, when incorporated in relatively thin filter elements at small concentrations as will be illustrated hereinafter.

The characteristics of the absorption that may be allowed of the aforementioned additive(s) in the visible region is largely dependent in color photography upon what is desired in the way of color correction for the photoflash radiation. As was briefly mentioned before, the spectral distribution of radiation emitted from a bare photoflash lamp does not approximate the desirable characteristics of daylight, which is taken to have a standard color temperature in the vicinity of 5,500° K. Generally, speaking, this bare photoflash radiation, having a color temperature of about 4,700° K, is too rich in red, i.e., wavelengths from about 600 to 700 nm, and relatively deficient in blue, i.e., wavelengths from about 400 nm to 500 nm.

Accordingly, several dyes are known and employed in the art as filter elements in connection with the color temperature correction of photoflash lamps. These dyes are selected mainly for their absorption characteristics in the visible region below 700 nm and generally provide compensation for the above-mentioned illumination excesses and deficiencies relative to standard daylight. Such "color correction" dyes possessing selective absorption in the visual region while providing essentially no absorption in the infrared region may be combined with other known dyes having strong infrared absorption with essentially no visible absorption to provide a filter element which is within the scope of this invention. Alternatively, a single dye possessing the desired spectral properties in both regions may be employed to accomplish the same result.

Thus, in one embodiment of this invention a dye or combination of dyes may be chosen which not only provides a peak of maximum absorption in the infrared region, but also provides some absorption in visible regions so as to enhance the spectral photographic qualities of the photoflash illumination. This enhancement may be accomplished in a variety of ways known to the art such as, for example, by providing the aforementioned absorption of excess radiation, e.g., red light, for color correction purposes, or by providing a small peak of absorption in spectral regions of overlapping color sensitivity, e.g., where the optically sensitized photographic emulsion cannot discriminate between red and green light, for the purpose of improving the color separation properties of the film.

Absorption in the ultraviolet region, i.e., from about 300 nm to about 400 nm, is an acceptable, if not preferable, property of the dye or dyes selected for employment in the present invention, since such absorption further serves to eliminate superfluous radiation. Furthermore, many photographic color films are sensitive to varying amounts of ultraviolet radiation with generally adverse results and, therefore, its elimination may be photographically desirable. However, ultraviolet radiation constitutes only a minor portion of the total radiation emitted from a typical photoflash lamp, i.e., usually less than 5%. It should be noted that it would not be desirable to select a dye or combination of dyes which possesses significant overlapping absorption into the blue visible region (above 400 nm) since, as briefly noted before, the radiation from bare photoflash lamps is already deficient in this region when compared to standard daylight.

From the foregoing discussion, it is apparent that, by the use of known materials, a filtration system can be "tailored" to fulfill photographic illumination requirements. However, the present invention is not concerned with the use of any particular dye or combination of dyes which shows desirable absorption in the visible region, yet fails to show the requisite strong absorption in the spectral region above 700 nm.

Several dyes alone or in combination are known and have been incorporated in the past with the various plastic substrates discussed above to control transmittance in various regions of the spectrum. These dyes are, therefore, contemplated as suitable in the practice of this invention if they meet the specific spectral requirements hereindescribed. Such dyes should also be light-fast and resistant to the heat and humidity associated with modern molding processes such as, for example, injection molding, as well as exhibit compatability with all the other materials in the plastic substrate system.

Several organic infrared-absorbing, visible-transmitting compounds are known in the art. As examples of such materials, mention may be made of the tris-(p-dialkylaminophenyl) aminium salts of U.S. Pat. Nos. 3,341,464 and 3,485,650; the diaryl-(N,N-diarylaminoaryl) aminium salts of U.S. Pat. No. 3,575,871; and the metal -$O_2S_2$ complexes of U.S. Pat. No. 3,806,462. Especially useful for the purposes of this invention are the dithiometal complexes of U.S. Pat. No. 3,588,216 such as, for example, the dyes represented by the formula:

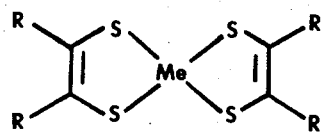

wherein Me represents a Group VIII metal such as Ni, Pd or Pt and R represents substituted or unsubstituted alkyl, aryl or heterocyclic groups. Particularly preferred because of their heat stability are the dyes of the above formula wherein Me is Pt and all R's are phenyl groups, substituted or unsubstituted.

Similarly, various types of dyes are known in the art for appropriately adjusting transmittance in the visible region as described above, and may be used, for example, in combination with the infrared absorbing compounds described immediately above. Especially useful for such is 1,4-bis(sec-butyl) amino-anthraquinone. Other useful dyes of the above described type are oil-soluble dyes of the anthraquinone type, such as the various substituted aminoanthraquinones of U.S. Pat. No. 2,611,772, particularly 1,4,5,8-tetrakis-methylamino-anthraquinone which shows, in addition to desirable visible absorption properties, a strong absorption peak in the region above 700 nm.

It is to be appreciated that, except as employed in the filter elements of this invention, the particular dye or combination of dyes per se do not constitute a part of this invention and that, to be within the intended scope of the present invention, said filter element must possess in addition to any other properties, a strong absorption peak in the spectral region above 700 nm, thereby significantly reducing transmission of photoflash radiation in that region. The subject matter of the present invention is thereby differentiated from any other photoflash filtration systems known or anticipated by the prior art.

It is not readily possible to assign limits to the amount of each additive which is desirable to use since in general, both the maximum and minimum concentration depend on the desired filtration properties and whether the additives are disseminated uniformly through the substrate or are concentrated in a barrier layer of the same or different substrate. To achieve the desired filter system, the plastic substrate chosen may be in various thicknesses; thus, if a thin sheet is used, higher concentrations of the absorbing material or materials are required; whereas with thicker layers or sheets, lower concentrations are required. It should be remembered, however, that the decreased intensity of the photoflash that results from large quantities of visible radiation absorbing dyes will proportionately decrease the distance from the subject at which the photoflash will be effective.

In preparing the filter element of the present invention, for example, the plastic envelope described hereinbefore, the absorbing agents may be incorporated in any suitable plastomeric material or applied on suitable transparent substrates of plastic or glass. This may be accomplished by several known procedures including dissemination of the compounds through or absorption onto the surface of the plastomeric material or after formation into the desired configuration, or alternatively by coating the compounds, in a suitable vehicle, directly onto, or on a layer near, the substrate or formed object.

The invention will be further illustrated in conjunction with the following specific example which is intended to be illustrative only and are not to be interpreted as limiting in any way.

EXAMPLE I

A plastic envelope having a thickness of 30 mils and similar in configuration to that bearing the number 11 in FIG. 1 was fabricated employing the following dye materials:

Dye 1

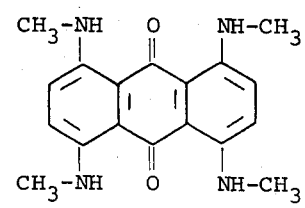

1,4,5,8-tetrakis-methylamino-anthraquinone

Dye 2

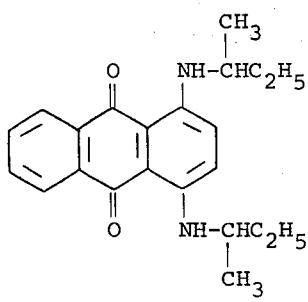

1,4-bis(sec-butyl) amino-anthraquinone

Polystyrene beads (Dow 666 U General Purpose [clear] Beads), Dye 1 at a concentration of 0.040 mg/gm of polystyrene, and Dye 2 at a concentration of 0.040 mg/gm of polystyrene were all placed in a metal can in the absence of a solvent and then agitated in a paint shaker for about 15 minutes. The envelope was formed by injection molding using the polystyrene-dye dispersion and a single cavity mold. The mold temperature was 105°C. and the heater cavity temperature was 375°C.

Figure 3:
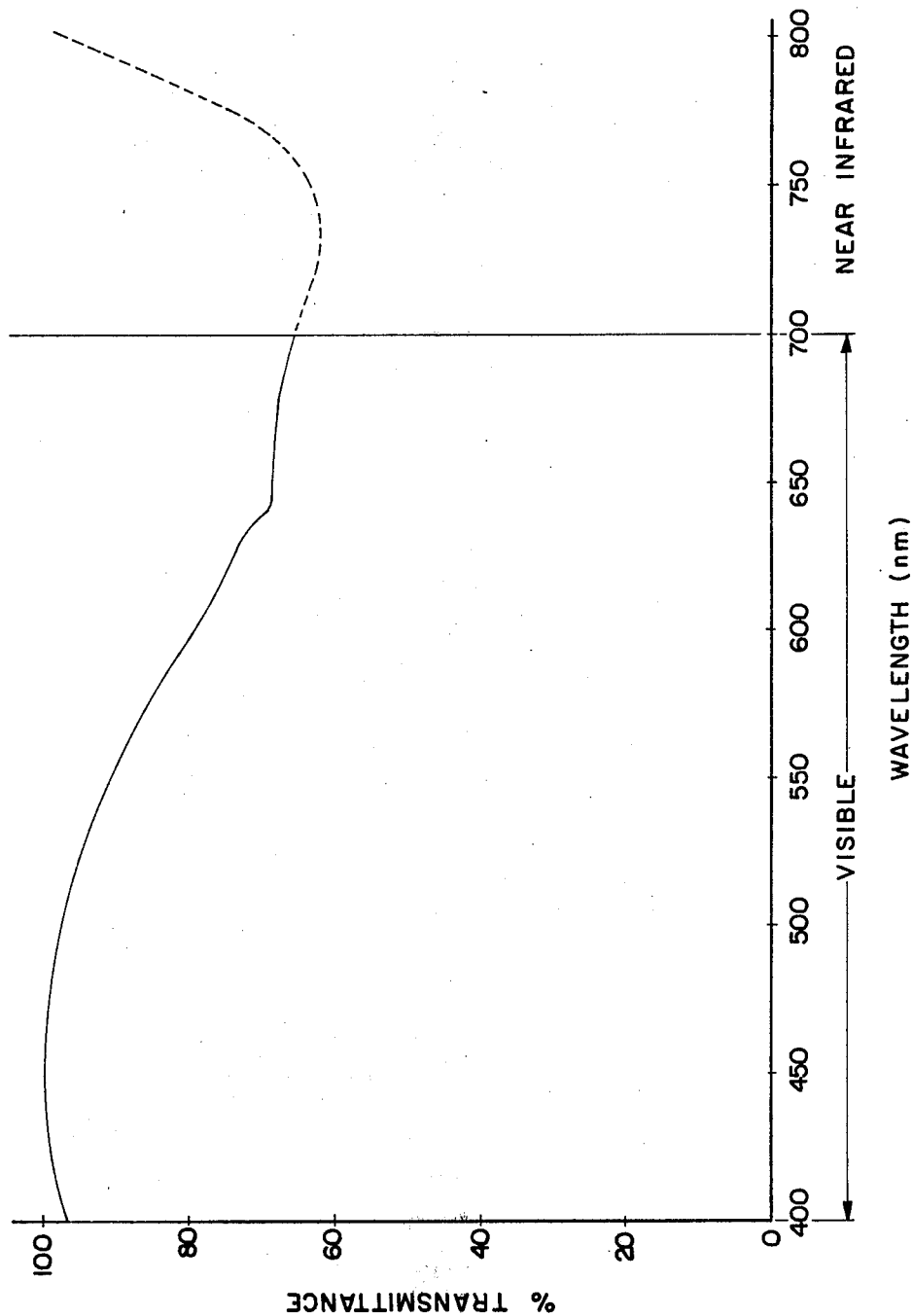
FIG. 3 is a diagrammatic plot of a transmittance curve for a filter system produced in accordance with the example detailed hereinafter.

The envelope fabricated above was then employed in a flashlamp array such as shown in FIG. 1 for the purpose of filtering the radiation emitted therefrom. FIG. 3 graphically represents the spectral distribution curve of the photoflash radiation transmitted by the envelope in the visible region (solid line) and in the near-infrared region (dotted line). It can be seen from FIG. 3 that the dye combination employed results in a significant decrease in the percentage of light transmitted in both the red region of the visible (advantageous for color correction purposes) and also a portion of the infrared region (advantageous for the purposes of eliminating superfluous radiation).

Since certain changes may be made in the above product without departing from the scope of the invention herein involved, it is intended that all subject matter contained in the above description or shown in the accompanying drawings shall be interpreted as illustrative and not in a limiting sense.

What is claimed is:

1. Illumination apparatus for use in photography comprising:
    a photoflash lamp which emits radiant energy having a distribution of wavelengths ranging from less than 400 nm to greater than 700 nm;
    a filter element associated with said photoflash lamp for filtering out the photographically superfluous radiation emitted by said photoflash lamp, said filter element comprising at least one material providing a maximum absorption of infrared radiation of wavelengths greater than 700 nm while providing maximum transmission of radiation in the visible region of the spectrum;
    said filter element being fabricated from an organic plastomeric material which is substantially transparent to radiation in said visible region, said filter element including either (a) the combination of 1,4,5,8-tetrakismethyl-amino-anthraquinone together with 1,4-bis(sec-buty) amino-anthraquinone or (b) the combination of 1,4,5,8-tetrakismethylamino-anthraquinone together with a dithiometal complex of the formula:

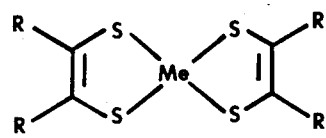

wherein Me is Ni or Pt; and all R's represent the same substituted or unsubstituted phenyl group;
    said filter element absorbing at least 10% of the total radiation having wavelengths between 700 nm and 2,000 nm.

2. Illumination apparatus as defined in claim 1 wherein said filter element is an envelope of said plastomeric material encompassing said photoflash lamp.

3. Illumination apparatus as defined in claim 2 wherein said plastomeric material is polystyrene.

4. Illumination apparatus as defined in claim 2 including a photoflash lamp assembly supporing an array of photoflash lamps adapted for selective ignition in sequence.

* * * * *

UNITED STATES PATENT AND TRADEMARK OFFICE
CERTIFICATE OF CORRECTION

PATENT NO. : 3,979,583
DATED : September 7, 1976
INVENTOR(S) : John J. McCann

It is certified that error appears in the above-identified patent and that said Letters Patent are hereby corrected as shown below:

Cover sheet, item [75], Inventor should be
--John J. McCann--.

Signed and Sealed this

Fourteenth Day of March 1978

[SEAL]

Attest:

RUTH C. MASON
*Attesting Officer*

LUTRELLE F. PARKER
*Acting Commissioner of Patents and Trademarks*